United States Patent [19]

Yoshimura et al.

[11] Patent Number: 4,856,360
[45] Date of Patent: Aug. 15, 1989

[54] TRANSMISSION CONTROL APPARATUS

[75] Inventors: Hiroshi Yoshimura, Hiroshima; Akihiro Shirata, Yokohama; Junzo Kuroyanagi, Kamakura, all of Japan

[73] Assignee: Isuzu Motor Limited, Tokyo, Japan

[21] Appl. No.: 250,700

[22] Filed: Sep. 29, 1988

[30] Foreign Application Priority Data

Sep. 29, 1987 [JP] Japan ................... 62-245660

[51] Int. Cl.$^4$ ............................................ B60K 20/10
[52] U.S. Cl. ................... 74/335; 74/336 R; 364/424.1
[58] Field of Search .......... 74/336 R, 335, 337; 192/84 R; 73/862.49; 364/424.1

[56] References Cited

U.S. PATENT DOCUMENTS

| 4,267,907 | 5/1981 | Hiraiwa | 192/3.56 |
| 4,291,586 | 9/1981 | Buetemeister | 74/335 |
| 4,603,596 | 8/1986 | Akashi et al. | 74/336 R |
| 4,621,328 | 11/1986 | Arai et al. | 74/335 X |
| 4,718,307 | 1/1988 | Yabe et al. | 74/335 X |
| 4,766,774 | 8/1988 | Tamai | 74/335 X |
| 4,796,485 | 1/1989 | Ebina | 74/335 X |

FOREIGN PATENT DOCUMENTS

| 58-134256 | 8/1983 | Japan | 74/335 |
| 58-137647 | 8/1983 | Japan | 74/335 |

Primary Examiner—Leslie A. Braun
Assistant Examiner—Christopher C. Campbell
Attorney, Agent, or Firm—Staas & Halsey

[57] ABSTRACT

An apparatus for controlling a transmission having a synchromesh has a shifting actuator having an electric motor for shifting gears of the transmission. A load on the synchromesh is measured when shifting the gears of the transmission. A shifting stroke value for the shifting actuator when the measured load on the the synchromesh falls within a predetermined range is learned and stored. Based on the stored shifting stroke value, the electric motor of the shifting actuator is controlled when shfting the transmission gears.

6 Claims, 4 Drawing Sheets

TRANSMISSION CONTROL APPARATUS

BACKGROUND OF THE INVENTION

The present invention relates to an apparatus for controlling a vehicular transmission, and more particularly to an apparatus for controlling a transmission actuator associated with a transmission having a synchromesh.

There have been developed in recent years electronically controlled automatic vehicular transmissions employing microcomputers.

Transmission actuators for actuating such automatic transmissions are generally hydraulically operated actuators.

Where a hydraulic transmission actuator is employed, a hydraulic pressure generating device is required to supply a hydraulic pressure for operating the hydraulic transmission actuator. There are also required a hydraulic circuit for connecting the hydraulic pressure generating device and the actuator, and a control valve and other components for controlling the hydraulic pressure to be supplied to the actuator. The overall transmission actuator system is large in size, heavy in weight, and costly to manufacture.

One transmission actuator proposed to eliminate the aforesaid problems employs an electric motor.

The transmission actuator employing an electric motor comprises the electric motor, a speed reducer for reducing the speed of rotation of the electric motor, and a transmission mechanism for converting the rotary motion from the speed motor into linear motion.

A transmission actuator for actuating a transmission having a synchromesh, particularly a shifting actuator, has a shifting stroke including a synchromesh region and a non-synchromesh region subsequent to synchromesh operation. A load in shifting operation within the synchromesh region (synchromesh load) is large as compared with the load required in the non-synchromesh region, and therefore a large thrust is necessary in the synchromesh region. If the actuator is operated in the non-synchromesh region while the large thrust remains to be applied, unnecessary forces would be imposed on the gears of the transmission, giving off impact sounds and lowering the durability and reliability of the components of the transmission.

One solution disclosed in Japanese Laid-Open Patent Publication No. 58-134256 includes a damping spring device mounted on a rod for operating a shifting lever, the rod being linearly movable by a transmission mechanism in a motor actuator.

Since the disclosed arrangement employs a damping spring device, however, the structure of the actuator is complex.

SUMMARY OF THE INVENTION

It is an object of the present invention to provide a transmission control apparatus capable of smoothly shifting transmission gears in synchromesh and non-synchromesh regions while preventing shocks from being produced by the gear shifting.

Another object of the present invention is to provide a transmission control apparatus which can prevent shocks from being generated upon shifting gears and effect smooth gear shifting without any complex damping device in a transmission actuator.

Yet another object of the present invention is to provide a transmission control apparatus which can well adapt itself to different dimensional variations of individual transmissions for allowing smooth gear shifting.

According to the present invention, there is provided an apparatus for controlling a transmission having a synchromesh, comprising: a shifting actuator having an electric motor for shifting gears of the transmission; means for detecting a shifting stroke of the shifting actuator when the shifting actuator shifts the gears; means for measuring a load on the synchromesh when the shifting actuator shifts the gears; means for learning a shifting stroke value of the shifting actuator when synchromesh operation of the synchromesh is finished, based on the measured load on the synchromesh; means for storing the learned shifting stroke value; and means for controlling the electric motor of the shifting actuator when shifting the gears, based on the stored shifting stroke value.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
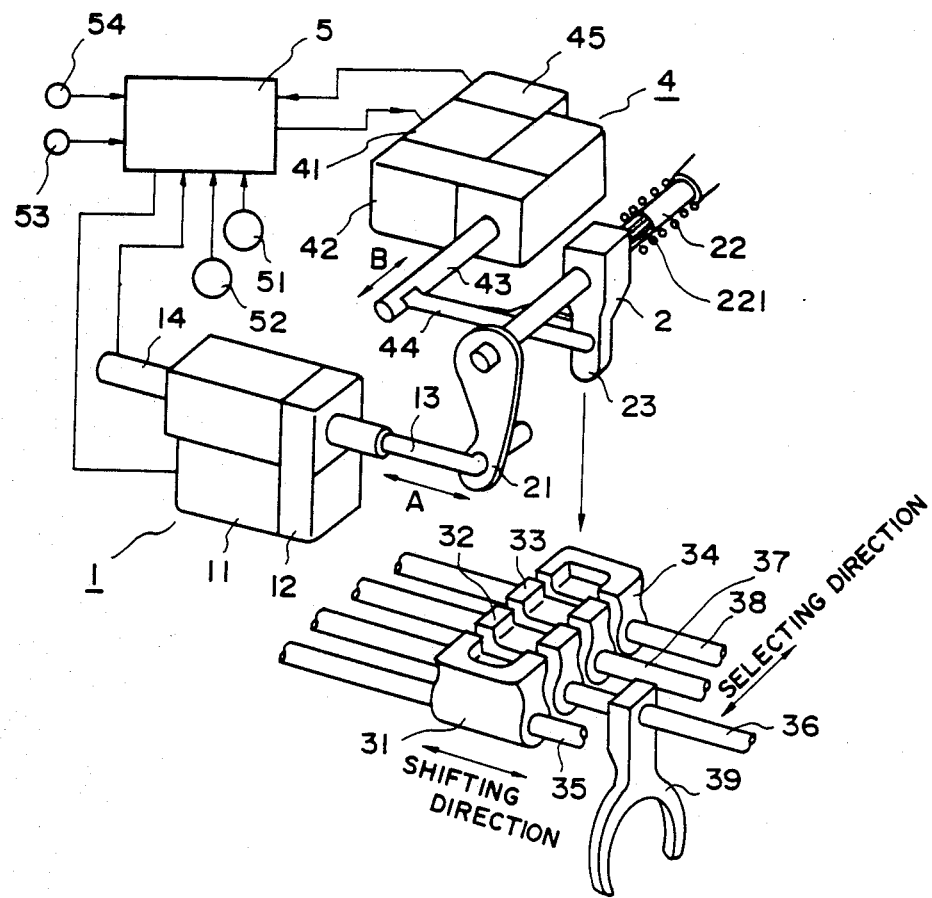
FIG. 1(a) is a schematic perspective view of a transmission control apparatus according to an embodiment of the present invention.
FIG. 1(b) is a diagram showing a shifting pattern in the transmission control apparatus shown in FIG. 1(a)
Figure 1:
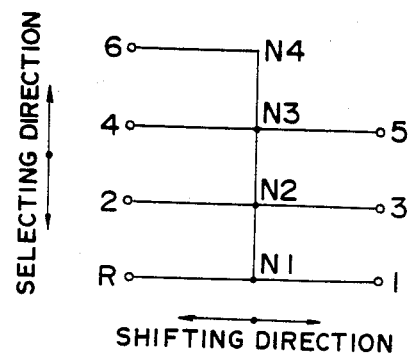

As shown in FIG. 1(a), a shifting actuator 1 comprises an electric motor 11, a speed reducer 12 coupled to the rotatable shaft of the electric motor 11 for reducing the speed of rotation of the electric motor 11 and including a converter mechanism for converting rotary motion into linear motion, and a rod 13 coupled to the speed reducer 12 and linearly movable in the directions of the arrow A. The operating position of the rod 13 of the shifting actuator 1 is detected by a stroke sensor 14 which applies a detected signal indicative of the operating position of the rod 13 to a controller 5 (described later).

As shifting lever 21 has one end pivotally coupled to the rod 13 and the other end connected to a shifting lever shaft 22.

An internal lever 2 has an upper end axially slidably splined to splines 221 of the shifting lever shaft 22. The internal lever 2 has a lower end 23 which is selectively engageable with shifting blocks 31, 32, 33, 34 mounted respectively on shifting rods 35, 36, 37, 38.

A shifting fork 39 is mounted on the shifting rod 36 for shifting gears between second and third gear positions, and engages a clutch sleeve (not shown) of a synchromesh of a transmission (not shown) for shifting gears between second and third gear positions. Likewise, shifting forks similar to the shifting fork 39 are mounted respectively on the shifting rods 35, 37, 38 and engage clutch sleeves for shifting gears between first and reverse gear positions, shifting gears between fourth and fifth gear positions, and shifting gears into a sixth gear position.

A selecting actuator 4 comprises an electric motor 41, a speed reducer 42 for reducing the speed of rotation of the electric motor 41 and including a converter mechanism for converting rotary motion into linear motion, and a rod 43 coupled to the speed reducer 42 and linearly movable in the directions of the arrow B. A selecting lever 44 has one end coupled transversely to the rod 43 of the selecting actuator 4 and the other end shaped into a bifurcated fork engaging an intermediate portion of the internal lever 2.

To the electric motor 41 of the selection actuator 4, there is attached a rotary encoder 45 which applies its output signal to the controller.

Operation of the transmission control mechanism constructed as above will be described below.

When the electric motor 41 of the selecting actuator 4 is energized, the rod 43 is moved in the directions of the arrow B through the speed reducer 42 to cause the selecting lever 44 to slide axially on the shifting lever shaft 22. The lower end 23 of the internal lever 2 then engages one of the shifting blocks 31, 32, 33, 34, thus completing a selecting process.

Then, the electric motor 11 of the shifting actuation 1 is energized to move the rod 13 in the directions of the arrow A through the speed reducer 12. Since the shifting fork shaft 22 is rotated about its own axis by the shifting lever 21, the internal lever 2 is angularly moved to operate the shifting block engaged by the lower end 23 of the internal lever 2, thereby completing a shifting process.

By thus operating the selecting actuator 4 and the shifting actuator 1, the transmission can select a desired gear position on the shifting pattern shown in FIG. 1(a).

A controller 5 in the form of a microcomputer includes a central processing unit for carrying out various calculations, memories for storing a control program for the transmission mechanism and learned values (described later), and an input/output circuit. The controller 5 is supplied with a signal from the stroke sensor 14, a signal from the rotary encoder 45, a signal from a select sensor 51 for detecting the position of the selecting lever 44 which is operated by the driver of a motor vehicle incorporating the transmission control apparatus, a signal from a clutch sensor 52 for detecting the engaging condition of the clutch of the motor vehicle, a vehicle speed sensor 53 for detecting the running speed of the vehicle, and an accelerator pedal depression sensor 54 for detecting the amount of depression of the accelerator pedal of the motor vehicle.

Figure 2:
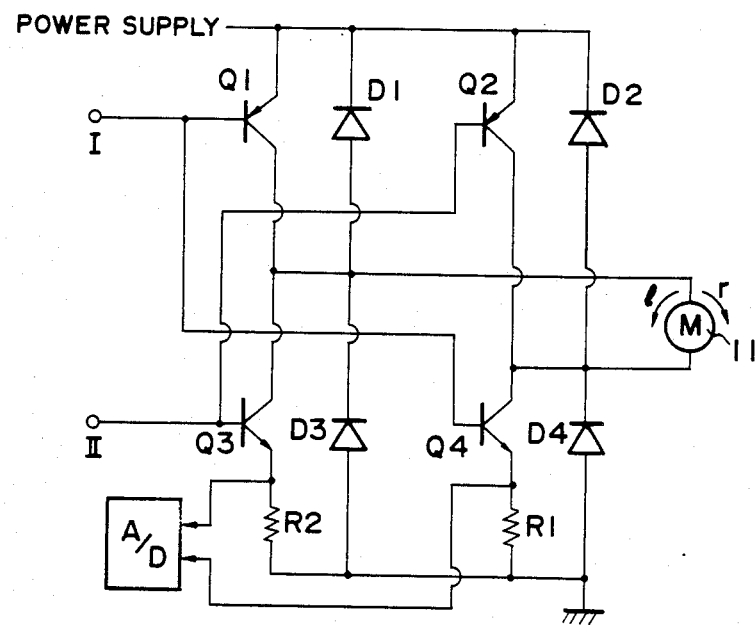
FIG. 2 is a circuit diagram of a driver circuit for an electric motor in the transmission control apparatus.

FIG. 2 shows a driver circuit for each of the electric motors 11, 41 for the shifting actuator 1 and the selecting actuator 4. The driver circuit includes transistors Q1 through Q4 and their protective diodes D1 through 4 which are connected as a bridge for controlling the direction of flow of a current through the electric motor 11 to control the direction of rotation of the electric motor 11. When a control signal is applied to a clockwise rotation terminal I, the transistors Q1, Q4 are rendered conductive, allowing a current to flow from the transistor Q1 to the motor 11 to the transistor Q4 to a resistor R1. The motor 11 is rotated clockwise in the direction of the arrow r, and a voltage drop V is developed across the resistor R1 which has a small resistance by the current flowing therethrough. The torque produced by the motor 11 can freely be controlled by controlling the duty ratio of the control signal applied to the clockwise rotation terminal I for controlling the electric power supplied to the motor 11. Since the torque produced by the electric motor 11 is almost fully proportional to the electric power supplied to the motor 11, the load on the motor 11 can be detected by measuring the voltage drop V across the resistor R1 or the current flowing through the resistor R1.

When a control signal is applied to a counterclockwise rotation terminal II, the load on the motor 11 can be detected by measuring a voltage drop across a resistor R2 or a current flowing through the resistor R2.

Figure 3:
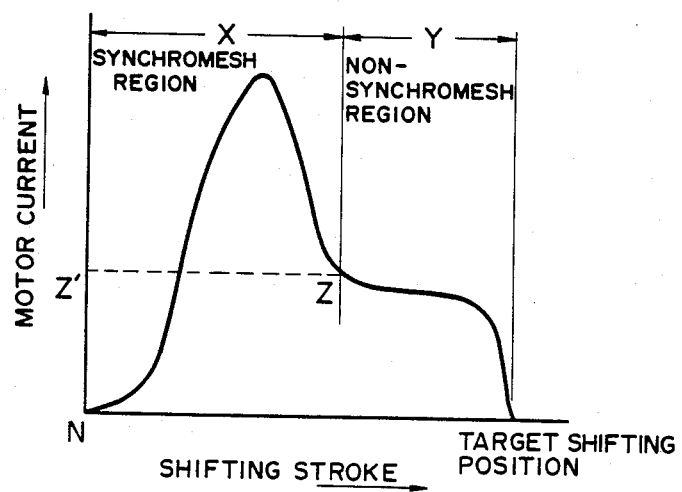
FIG. 3 is a diagram showing how a current flowing through the electric motor varies in gear shifting operation.

FIG. 3 illustrates the manner in which the current flowing through the motor for the shifting actuator varies in shifting operation. The horizontal axis of the graph of FIG. 3 indicates a shirting stroke from a neutral point N to a target shifting position, and the vertical axis an electric current flowing through the motor. Indicated at X is a synchromesh region in which the motor load is increased by synchromesh operation of the synchromesh and thus the motor current rises. Denoted at Y is a non-synchromesh region in which the motor current is lowered and eliminated when gears are shifted into the target shifting position. At a point Z, operation of the synchromesh leaves the synchromesh region and enters the non-synchromesh region. The motor current flowing during shifting operation is measured, and while the measured current is on the decrease, it enters in a stable reduction zone at the point Z.

Therefore, by storing a current value Z' at the point Z and the shifting stroke at the point Z as learned values, the transition from the synchromesh region into the non-synchromesh region during shifting operation can be determined by measuring the motor current.

Figure 4:
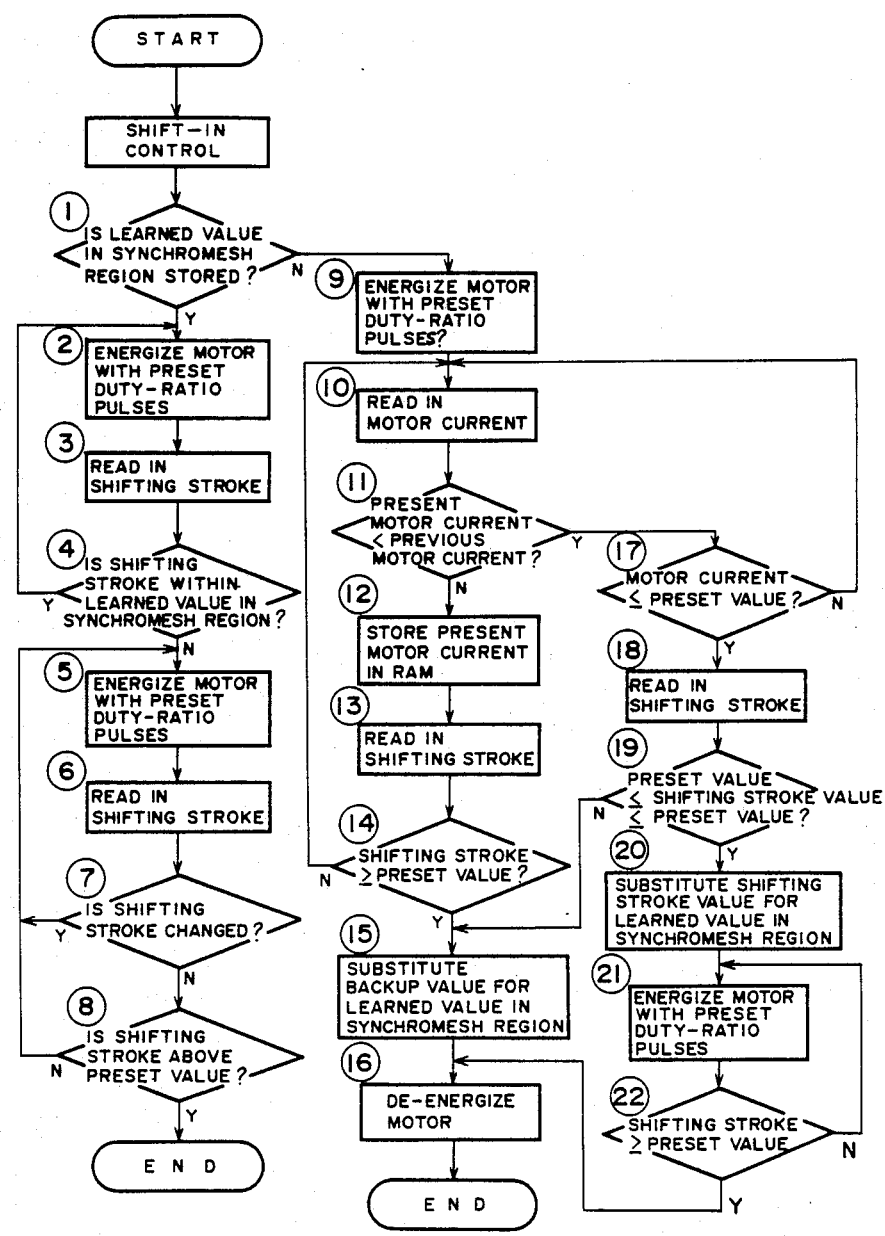
FIG. 4 is a flowchart of an operation sequence of the transmission control apparatus.

FIG. 4 shows an operation sequence of the transmission control apparatus of the invention. A process of controlling the transmission to be shifted into a desired gear position will hereinafter be described with reference to FIG. 4.

A step 1 determines whether a learned value in the synchromesh region is stored in the memory in the controller 5. If there is a learned value stored, then control goes to a step 2 in which the motor 1 is energized by preset dutyratio pulses. In a next step 3, a shifting stroke is read from a signal from the stroke sensor 14. A step 4 checks if the shifting stroke is within the learned value, or the synchromesh region X. If the shifting stroke is within the region X, then control repeats the steps 2 and 3.

If the shifting stroke is not within the region X in the step 4, then the motor 11 is energized by preset duty-ratio pulses with the current value at Z' being used as an upper limit, in a step 5. In a next step 6, the value of the shifting strike is read from a signal from the stroke sensor 14. A step 7 determines whether the shifting stroke is changed or not. If the shifting stroke has reached a preset value, then the transmission is in a target shifting position, and control is ended. Since the current flowing through the motor 11 is limited by duty-ratio control the transmission is prevented from having unnecessary shocks when shifting transmission gears into the target gear position.

If there is no learned value in the synchromesh region in the step 1, then control goes to a step 9 in which the motor 11 is energized by preset duty-ratio pulses. In a next step 10, the motor current is read from a voltage drop across the resistor R1 or R2. The present motor current and the starting motor current are compared in a step 11. If the present motor current is smaller than the starting motor current, then control goes to a step 17 which compares the motor current value with a preset current value. If the motor current is lower than the preset current value, then a shifting stroke is read from a signal from the shifting stroke sensor 14 in a step 18, followed by a step 19 that determines whether the read-in shifting stroke is between two preset values or not. If it is, then the read-in shifting stroke is stored as a learned value in the RAM in a step 20, and the motor is energized by preset duty-ratio pulses in a step 21. A step 22 checks if the shifting stroke value has reached a preset target value or not. If yes, control goes to a step 26 in which the motor is de-energized.

If the motor current value is not lower than the starting current value in the step 11, then the motor current value is stored in the RAM in a step 12 and a shifting stroke is read from a signal from the shifting stroke sensor 14 in a step 13. The shifting stroke value is compared with a preset value in a step 14. If the shifting stroke value is smaller than the preset value in the step 14, then the steps 10 through 3 are repeated. If the shifting stroke value is greater than the preset value in the step 14, a backup value is used as a learned value in the synchromesh region in a step 15, and then the motor is de-energized in the step 16.

Figure 5:
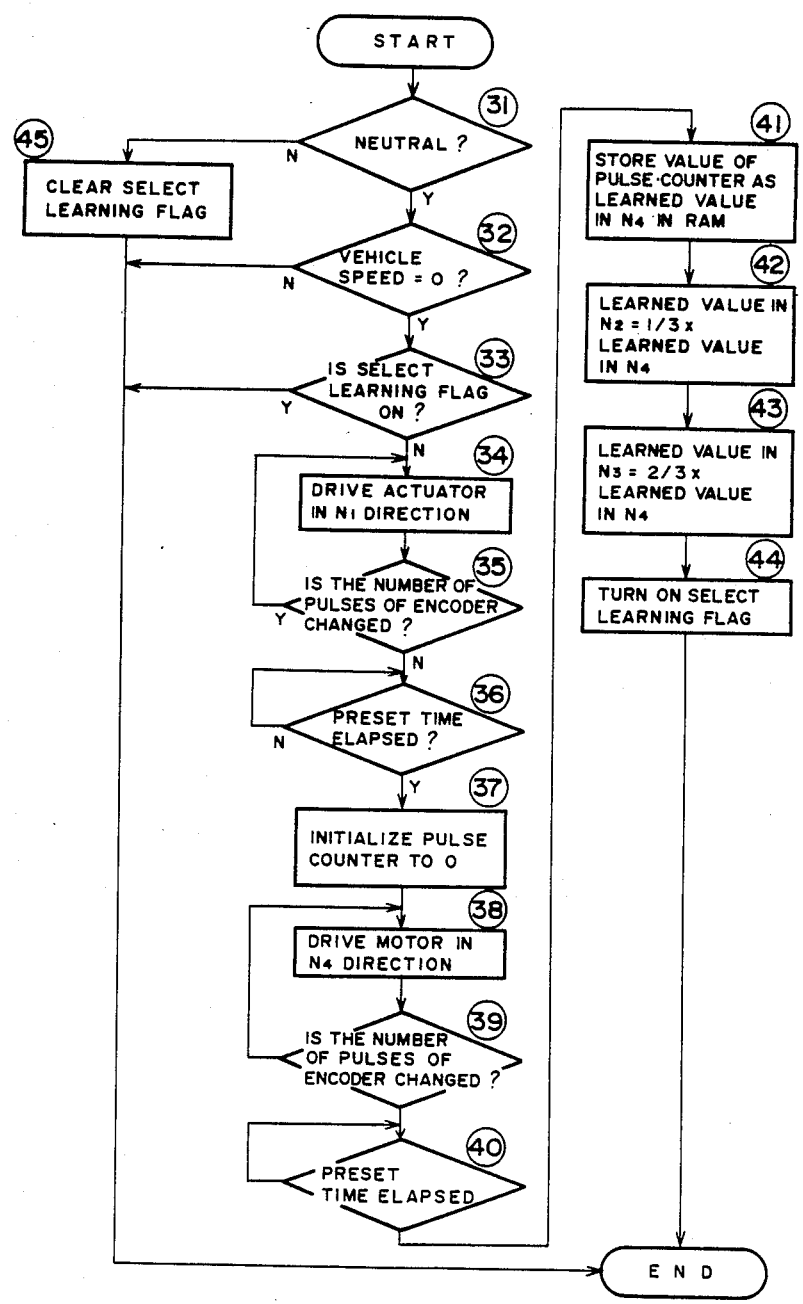
FIG. 5 is a flowchart of another operation sequence of the transmission control apparatus.

FIG. 5 is a processing sequence for learning neutral positions N1, N2, N3, N4 in the shifting pattern illustrated in FIG. 1(b). Since selecting operation is effected by controlling the motor 41 with the number of pulses from the rotary encoder 45. The output signal from the rotary encoder 45 is initialized in the neutral position N1.

Whether or not the transmission gears are in a neutral position is determined from a signal from the selecting sensor 51 in a step 31. A next step 32 determines whether the speed of travel of the motor vehicle is zero or not. Then, a step 33 checks if a select learning flag is on or not. If the gears are in the neutral position, the vehicle speed is zero, and the select learning flag is off, then the selecting actuator 4 is driven in an N1 direction, i.e., toward the neutral position N1, in a sep 34. A step 35 then checks with the number of pulses from the rotary encoder 45. If the number of pulses from the rotary encoder 45, then the step 34 is repeated until it becomes unchanged. When the number of pulses from the rotary encoder 45 becomes unchanged in the step 35,i.e., when the lower end 23 of the internal lever 2 abuts against the shifting block 31, a step 36 checks whether a preset period of time has elapsed or not. If elapsed, then the value of a counter for counting pulses from the rotary encoder 45 is initialized to zero in a step 37.

Then, the neutral position N4 is learned in steps 38 through 41. More specifically, the motor 41 is energized toward the neutral position N4 in the step 38. When the lower end 23 of the internal lower lever 2 engages the shifting block 34 and the number of pulses from the rotary encoder 45 becomes unchanged in the step 39, the elapse of a preset period of time is waited for in the step 40. Upon elapse of the preset period of time and when a selecting N4 switch is on, the value of the counter for counting pulses from the rotary encoder 45 is stored as a learned value for the position N4 in the RAM in the step 41;

The neutral positions N2, N3 are learned in steps 42 through 44. More specifically, the neutral positions N2, N3 are proportionally calculated from the learned value for the neutral position N4. Assuming that the neutral positions N2, N3 are equally divided positions between the positions N1 and N4, a learned value for the position N2 is calculated according to the formula ($=\frac{1}{3}\times N4$) and stored in the RAM in the step 42. Then, a learned value for the position N3 is calculated according to the formula ($=\frac{2}{3}\times N4$) and stored in the RAM in the step 43. After the learning process is over, the select learning flag is turned on in the step 44.

Since the above learning process is effected only in the neutral positions, if the gears are not in any neutral position in the step 33, then the select learning flag is cleared in a step 45.

Although certain preferred embodiments have been shown and described, it should be understood that many changes and modifications may be made therein without departing from the scope of the appended claims.

What is claimed is:

1. An apparatus for controlling a transmission having a synchromesh, comprising:
   a shifting actuator having an electric motor for shifting gears of the transmission;
   means for detecting a shifting stroke of said shifting actuator when said shifting actuator shifts the gears;
   means for measuring a load on the synchromesh when said shifting actuator shifts the gears;
   means for learning a shifting stroke value of said shifting actuator when synchromesh operation of the synchromesh is finished, based on the measured load on the synchromesh;
   means for storing the learned shifting stroke value; and
   means for controlling the electric motor of said shifting actuator when shifting the gears, based on the stored shifting stroke value.

2. An apparatus according to claim 1, wherein said means for measuring the load on the synchromesh comprises means for measuring a load current flowing through said electric motor of the shifting actuator.

3. An apparatus according to claim 2, wherein said means for learning the shifting stroke value comprises means for learning a shifting stroke value for the shifting actuator when the value of a load current flowing through the electric motor, as measured by means for measuring the load current flowing through the electric motor of said shifting actuator, becomes stable.

4. An apparatus according to claim 3, wherein said means for learning the shifting stroke value comprises means for learning a shifting stroke value for the shifting actuator when the value of a load current flowing through the electric motor, as measured by means for measuring the load current flowing through the electric motor of said shifting actuator, becomes stable and is lower than a prescribed value.

5. An apparatus according to claim 1, wherein said means for learning the shifting stroke value comprises means for learning a shifting stroke value for the shifting actuator when the shifting stroke value for said shifting actuator at a time the synchromesh operation of the synchromesh is finished is within a predetermined range.

6. An apparatus according to claim 1, wherein said means for learning the shifting stroke value comprises means for substituting a backup value for a learned shifting stroke value for the shifting actuator when the shifting stroke value for said shifting actuator at a time the synchromesh operation of the synchromesh is finished is outside of a predetermined range.

* * * * *